United States Patent
Sunderland et al.

[11] Patent Number: 5,811,206
[45] Date of Patent: Sep. 22, 1998

[54] FEEDTHROUGH PIN INSULATOR, ASSEMBLY AND METHOD FOR ELECTROCHEMICAL CELL

[75] Inventors: Walter C. Sunderland, Minnetonka; David P. Haas, Brooklyn Park, both of Minn.

[73] Assignee: Medtronic, Inc., Minneapolis, Minn.

[21] Appl. No.: 962,561

[22] Filed: Oct. 31, 1997

[51] Int. Cl.$^6$ .................................................. H01M 2/26
[52] U.S. Cl. ......................... 429/181; 429/184; 29/623.1
[58] Field of Search ................................... 429/181, 184, 429/178, 185, 101, 199, 218; 29/623.1

[56] References Cited

U.S. PATENT DOCUMENTS

| | | | |
|---|---|---|---|
| 3,517,128 | 6/1970 | Hines | 606/198 |
| 4,242,425 | 12/1980 | O'Boyle et al. | 429/181 |
| 4,304,240 | 12/1981 | Perlin | 128/671 |
| 4,310,609 | 1/1982 | Liang et al. | 429/194 |
| 4,391,729 | 7/1983 | Liang et al. | 252/182.1 |
| 4,421,833 | 12/1983 | Zayatz | 429/101 |
| 4,576,162 | 3/1986 | McCorkle | 128/303 R |
| 4,640,298 | 2/1987 | Pless et al. | 128/784 |
| 4,687,716 | 8/1987 | Nagaura | 429/145 |
| 4,699,147 | 10/1987 | Chilson et al. | 128/642 |
| 4,706,688 | 11/1987 | Michael et al. | 128/785 |
| 4,722,347 | 2/1988 | Abrams et al. | 128/633 |
| 4,804,595 | 2/1989 | Bakos et al. | 429/194 |
| 4,817,611 | 4/1989 | Arzbaecher et al. | 128/642 |
| 4,883,070 | 11/1989 | Hanson | 128/785 |
| 4,920,979 | 5/1990 | Bullara | 128/784 |
| 4,930,521 | 6/1990 | Metzger et al. | 128/786 |
| 4,946,457 | 8/1990 | Elliott | 606/1 |
| 5,010,894 | 4/1991 | Edhag | 128/785 |
| 5,114,810 | 5/1992 | Frysz et al. | 429/194 |
| 5,117,828 | 6/1992 | Metzger et al. | 128/642 |
| 5,154,387 | 10/1992 | Trailer | 128/784 |
| 5,170,803 | 12/1992 | Hewson et al. | 128/786 |
| 5,194,342 | 3/1993 | Bito et al. | 429/191 |
| 5,221,453 | 6/1993 | Crespi | 204/291 |
| 5,250,373 | 10/1993 | Muffoletto et al. | 429/161 |
| 5,263,493 | 11/1993 | Avitall | 607/122 |
| 5,290,414 | 3/1994 | Marple | 204/252 |
| 5,298,349 | 3/1994 | Takeuchi | 429/219 |
| 5,312,458 | 5/1994 | Muffoletto et al. | 29/623.1 |
| 5,370,679 | 12/1994 | Atlee, III | 607/124 |
| 5,379,765 | 1/1995 | Kajiwara et al. | 128/642 |
| 5,389,472 | 2/1995 | Takeuchi et al. | 419/219 |
| 5,406,946 | 4/1995 | Imran | 128/642 |
| 5,415,959 | 5/1995 | Pyszczek et al. | 419/249 |
| 5,417,713 | 5/1995 | Cohen | 607/4 |
| 5,431,696 | 7/1995 | Atlee, III | 607/124 |
| 5,435,874 | 7/1995 | Takeuchi et al. | 156/242 |
| 5,443,928 | 8/1995 | Takeuchi et al. | 429/218 |
| 5,449,381 | 9/1995 | Imran | 607/122 |
| 5,498,494 | 3/1996 | Takeuchi et al. | 429/219 |
| 5,545,497 | 8/1996 | Takeuchi et al. | 429/219 |
| 5,716,729 | 2/1998 | Sunderland et al. | 429/181 X |

*Primary Examiner*—Anthony Skapars
*Attorney, Agent, or Firm*—Thomas F. Woods; Harold R. Patton

[57] ABSTRACT

A feedthrough pin insulator and corresponding assembly for an electrochemical cell powering an implantable medical device are described herein. The feedthrough pin insulator electrically insulates a feedthrough pin extending between the internal and external portions of the cell from cell components having the same electrical potential as a cathode disposed within the cell. The feedthrough pin insulator extends between an anode disposed within the cell and a ferrule disposed in an aperture of a cover for sealing the cell. A gate or dam is disposed at one end of the insulator for preventing or inhibiting the formation of anode flash on the feedthrough pin or in other undesired locations or on certain cell components during the anode formation process. A method of forming an anode is also described which corresponds to the foregoing apparatus.

23 Claims, 15 Drawing Sheets

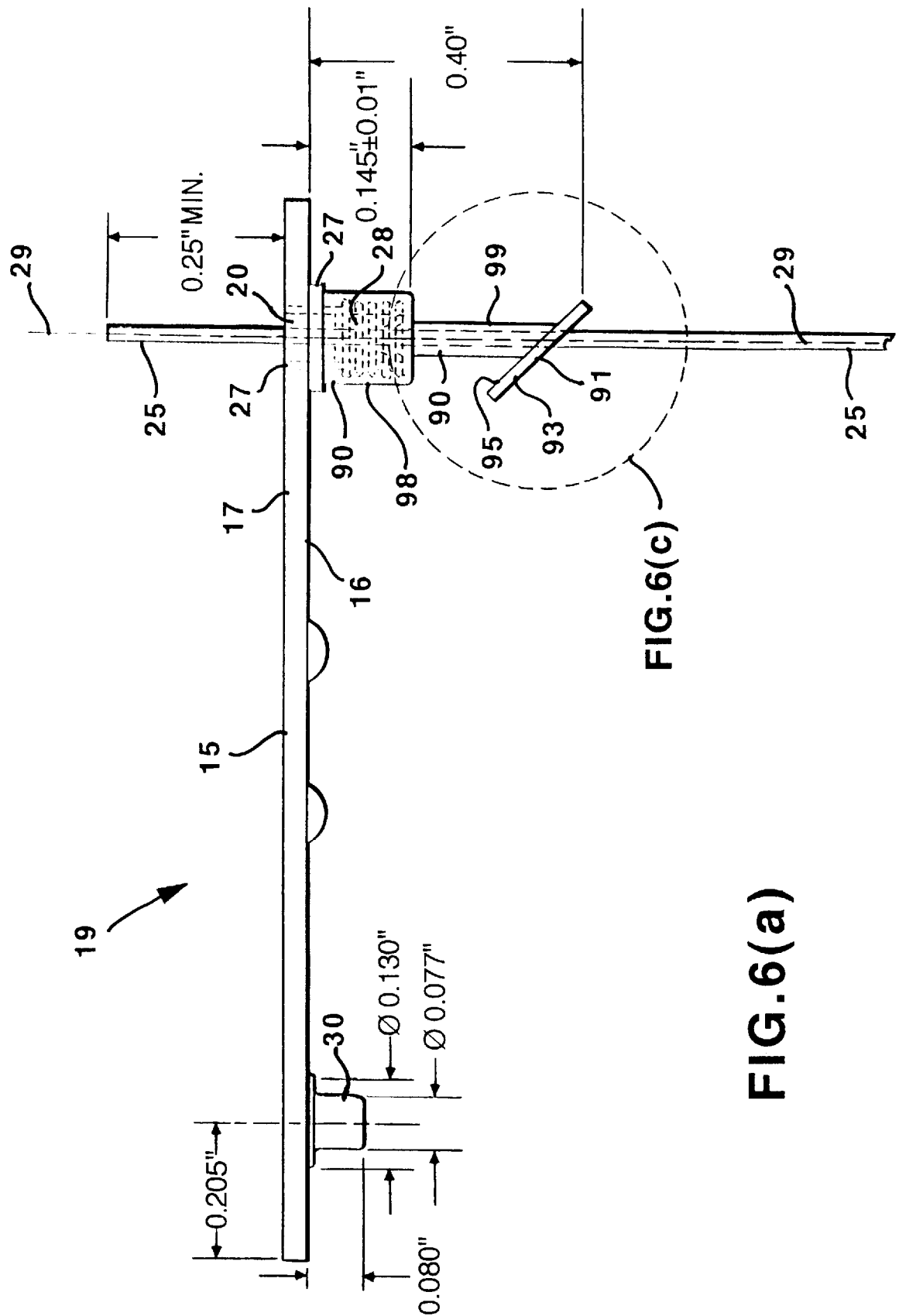

to fig. 10(b)

FEEDTHROUGH PIN INSULATOR, ASSEMBLY AND METHOD FOR ELECTROCHEMICAL CELL

FIELD OF THE INVENTION

This invention relates to a feedthrough pin insulator and assembly for an electrochemical cell, and corresponding methods of making and using same. The cell is typically of, but not limited to, a type employing a manganese dioxide cathode and lithium anode. This type of cell is commonly used as a hermetically sealed cell for powering implantable medical devices.

BACKGROUND OF THE INVENTION

In constructing an electrochemical cell for use in implantable medical devices, a known method of making a cathode is to compress a mixture of powdered manganese dioxide, a conductive matrix such as graphite or carbon black and binding material such as powdered TEFLON™. One method of providing contact between the cathode and current collector is to imbed the collector inside the cathode powder mixture before compressing the mixture into a pellet. For an example of this type of collector, see U.S. Pat. No. 4,128,703.

A drawback of this imbedding method is that, as the cathode is discharged, the volume of the pellet tends to expand during electrochemical reaction. As the pellet expands, there is often degradation of the contact between the pellet and the collector screen, causing changes in cathode impedance. During latter stages of discharge, cathode expansion may cause uncertain effects upon impedance. At times, the collector-cathode contact may actually improve, again altering the impedance.

The variability of collector-cathode impedance complicates the use of an electrochemical cell to power circuits, particularly in body implantable applications such as pacemakers, neurostimulators and drug infusing pumps, where compactness and efficiency of circuit design is desired. If such cells are used, the design of the device circuits must contemplate the output variability of the cell and thus, greater material and space resources must be expended in the circuit design. It is therefore an object of the present invention to provide a cell with an improved design and method for making same.

During the formation of lithium anode bodies for use in electrochemical cells for powering implantable medical devices, it has been common practice to form such bodies using appropriately shaped tooling having dies in conjunction with a press. Such tooling typically contains many different components, is cumbersome to operate, and often results in anode bodies and corresponding current collectors and feedthrough pins attached thereto, where anode flash must be hand removed or sculpted from the formed anode body, or where discrete insulators placed on feedthrough pins are mis-assembled or missing upon completion of the anode formation step. Such anode formation steps also may result in undesired or unintentional bending of feedthrough pins. The foregoing anode formation process or method results in increased manufacturing costs, reduced cell reliability and further requires extensive, on-going maintenance of the tooling.

Disclosures relating to feedthroughs for batteries powering implantable medical devices and other devices include the patents and other references listed below in Table 1.

TABLE 1

Issued U.S. Pat. Nos.

| U.S. Pat. No. | Issue Date | Inventor(s) | Class/subclass |
|---|---|---|---|
| 3,517,128 | 6/1970 | Hines | 606/198 |
| 4,304,240 | 12/1981 | Perlin | 128/642 |
| 4,310,609 | 1/1982 | Liang et al. | 429/194 |
| 4,391,729 | 7/1983 | Liang et al. | 252/182.1 |
| 4,576,162 | 3/1986 | McCorkle | 128/419P |
| 4,640,298 | 2/1987 | Pless et al | 128/784 |
| 4,687,716 | 8/1987 | Nagaura | 429/145 |
| 4,699,147 | 10/1987 | Chilson et al | 128/642 |
| 4,706,688 | 11/1987 | Don Michael et al. | 128/785 |
| 4,722,347 | 2/1988 | Abrams et al. | 128/663 |
| 4,804,595 | 2/1989 | Bakos et al. | 429/194 |
| 4,817,611 | 4/1989 | Arzbaecher et al. | 128/642 |
| 4,883,070 | 11/1989 | Hanson | 128/419P |
| 4,920,979 | 5/1990 | Bullara | 28/784 |
| 4,930,521 | 6/1990 | Metzger et al. | 128/786 |
| 4,946,457 | 8/1990 | Elliott et al. | 606/1 |
| 5,010,894 | 4/1991 | Edhag et al. | 128/785 |
| 5,114,810 | 5/1992 | Frysz et al. | 429/194 |
| 5,117,828 | 6/1992 | Metzger et al. | 128/642 |
| 5,154,387 | 10/1993 | Trailer | 128/784 |
| 5,170,803 | 12/1992 | Hewson et al. | 128/786 |
| 5,194,342 | 3/1993 | Bito et al. | 429/191 |
| 5,221,453 | 6/1993 | Crespi | 204/291 |
| 5,250,373 | 10/1993 | Muffoletto et al. | 429/161 |
| 5,263,493 | 11/1993 | Avitall | 607/122 |
| 5,290,414 | 3/1994 | Marple | 204/252 |
| 5,298,349 | 3/1994 | Takeuchi | 429/219 |
| 5,312,458 | 5/1994 | Muffoletto et al. | 29/623.1 |
| 5,370,679 | 12/1994 | Atlee, III | 607/124 |
| 5,379,765 | 1/1995 | Kajiwara et al. | 128/642 |
| 5,389,472 | 2/1995 | Takeuchi et al. | 429/219 |
| 5,406,946 | 4/1995 | Imran | 128/642 |
| 5,415,959 | 5/1995 | Pyszczek et al. | 429/249 |
| 5,417,713 | 2/1993 | Cohen | 607/4 |
| 5,431,696 | 7/1995 | Atlee, III | 607/124 |
| 5,435,874 | 7/1995 | Takeuchi et al. | 156/242 |
| 5,443,928 | 8/1995 | Takeuchi et al. | 429/218 |
| 5,449,381 | 9/1995 | Imran | 607/122 |
| 5,498,494 | 3/1996 | Takeuchi et al. | 429/219 |
| 5,545,497 | 8/1996 | Takeuchi et al. | 429/219 |

As those skilled in the art will appreciate upon reading the Summary of the Invention, Detailed Description of the Preferred. Embodiments and Claims set forth herein, at least some of the devices and methods disclosed in the patents of Table 1 may be modified advantageously using the teachings of the present invention.

SUMMARY OF THE INVENTION

The present invention has certain objects. That is, the present invention provides solutions to at least some of the problems existing in the prior art respecting feedthroughs for batteries or electrochemical cells in implantable medical devices. At least some aspects of conventional electrochemical cells for implantable medical devices may be characterized as:

(a) requiring "flash" from anode material to be hand-sculpted into the anode body or from feedthrough insulators during the cell manufacturing process;

(b) having missing or mis-assembled discrete feedthrough insulators;

(c) requiring cumbersome, expensive tooling for the manufacture thereof;

(d) requiring on-going, extensive maintenance to tooling for the manufacture thereof; and (e) being formed using tooling prone to misshaping or bending feedthrough pins thereof;

The present invention provides solutions to at least some of the problems associated with conventional or prior art devices.

At least some embodiments of the present invention provide certain advantages, including, but not limited to, a feedthrough insulator and assembly for an electrochemical cell in an implantable medical device that:

(a) reduce scrap;
(b) reduce manufacturing costs;
(c) eliminate manufacturing steps required in the prior art;
(d) permit the use of an offset anode design, resulting in a thinner profile battery and corresponding implantable medical device;
(e) permit the provision of batteries having more uniform, consistent structural and electrochemical specifications such as shape and thickness than has heretofore been possible;
(f) may be molded or formed from many different materials, even with the same mold cavity;
(g) have a feedthrough pin disposed therewithin and therethrough, the pin being bent prior to the insulator being molded therearound, the resulting feedthrough insulator assembly not being prone to accidental bending of the feedthrough pin prior to a discrete separate insulator being placed thereon or therearound;
(h) electrically insulate the feedthrough pin from cell components having the same electrical potential as the cathode, including the cathode;

At least some embodiments of the present invention have certain features, including, but not limited to, a feedthrough insulator and assembly for an electrochemical cell in an implantable medical device having one or more of the following features:

(a) a gate formed in or attached to a feedthrough pin insulator;
(b) a feedthrough pin insulator that extends from the flange of a ferrule disposed on or in a cover along a feedthrough pin and into an anode body;
(c) a feedthrough pin insulator which electrically insulates a feedthrough pin disposed therewithin from a cathode or component of a cell having the same electrical potential as the cathode;
(d) a feedthrough pin insulator molded in a shape which imparts additional structural integrity and robustness to a combined assembly comprising a feedthrough pin insulator assembly, an anode and an anode current collector;
(e) a header assembly that, when placed in tooling of the present invention, tightly fits or engages the lower block, header support block, lower punch and upper punch such that no or little flash forms on undesired portions of the anode, feedthrough pin insulator, feedthrough pin insulator assembly or tooling for forming the anode;
(f) a method of forming an anode that requires fewer steps and tooling components than in prior art methods, and
(g) a method of forming an anode that requires less cycle time than in prior art methods.

Numerous other objects, features and advantages of the present invention will become readily apparent from the appended detailed description of the invention, drawings and claims.

BRIEF DESCRIPTION OF DRAWINGS

The invention will be further described with reference to the accompanying drawings, in which:

FIGS. 6(a) through 6(e) show selected views of another embodiment of the feedthrough pin insulator of the present invention and corresponding feedthrough components and battery cover;

DETAILED DESCRIPTION OF THE PREFERRED EMBODIMENTS

Figure 1:
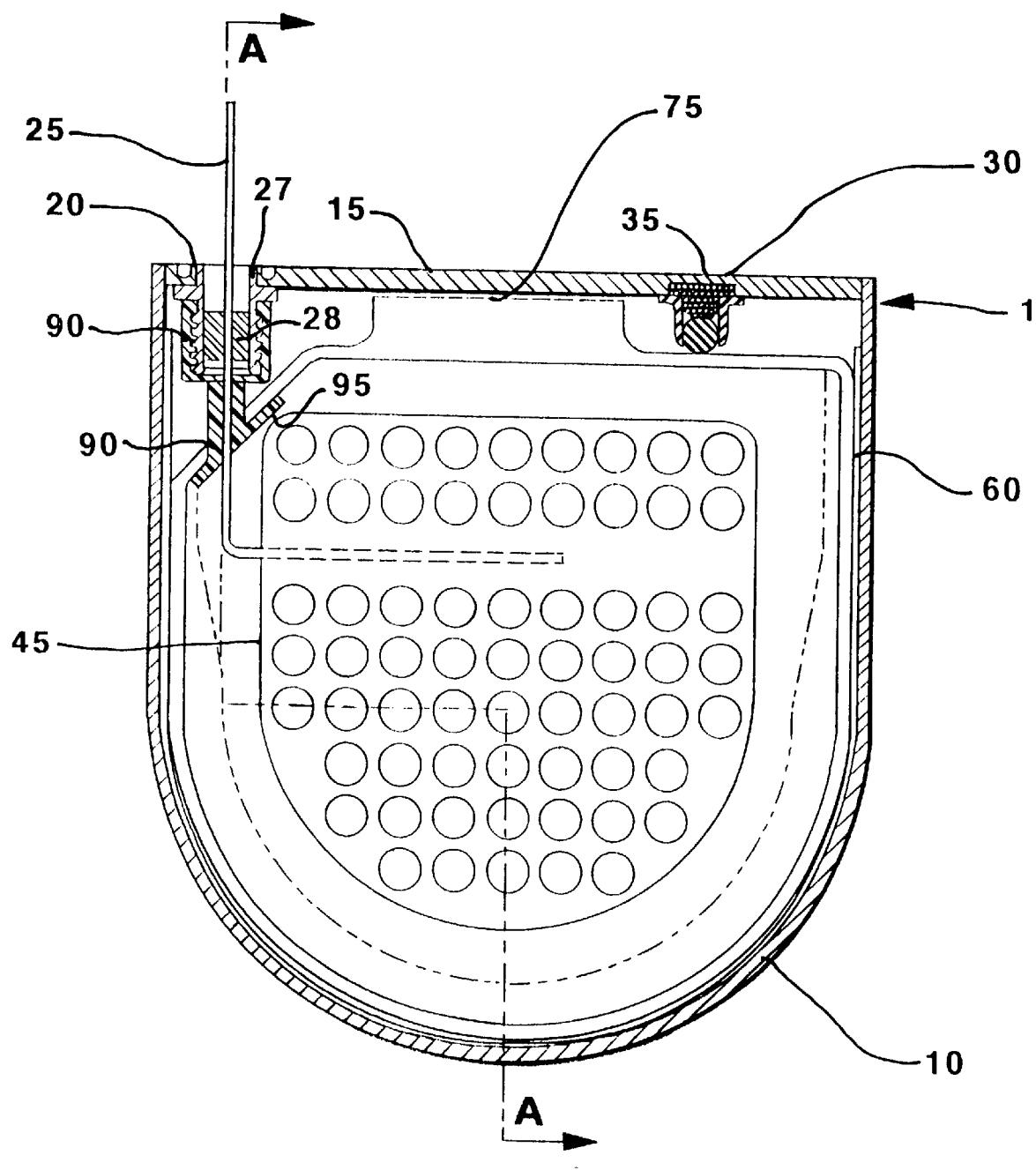
FIG. 1 shows a cross-sectional elevational view of a cell having one embodiment of the present invention disposed therein.

FIG. 1 shows electrochemical cell 1 according to one embodiment of the invention. Cell housing 10 is formed of a metal such as stainless steel or titanium. Housing cover 15 is placed atop cell housing 10 which is hermetically closed with a laser weld around the entire edge of cover 15. Cover 15 has opening or aperture 20 to allow feedthrough or conducting pin 25 to be placed therethrough in a feedthrough assembly which electrically insulates pin 25 from housing 10 and also hermetically seals opening 20.

Cover 15 further has electrolyte fill port 30 which permits a liquid electrolyte to be poured inside housing 10 after assembly of cell 1 has been substantially completed. Disc 35 is most preferably welded into the fill port to provide a hermetic seal as taught in U.S. Pat. No. 4,542,080, the disclosure of which is hereby incorporated by reference herein in its entirety.

Figure 2:
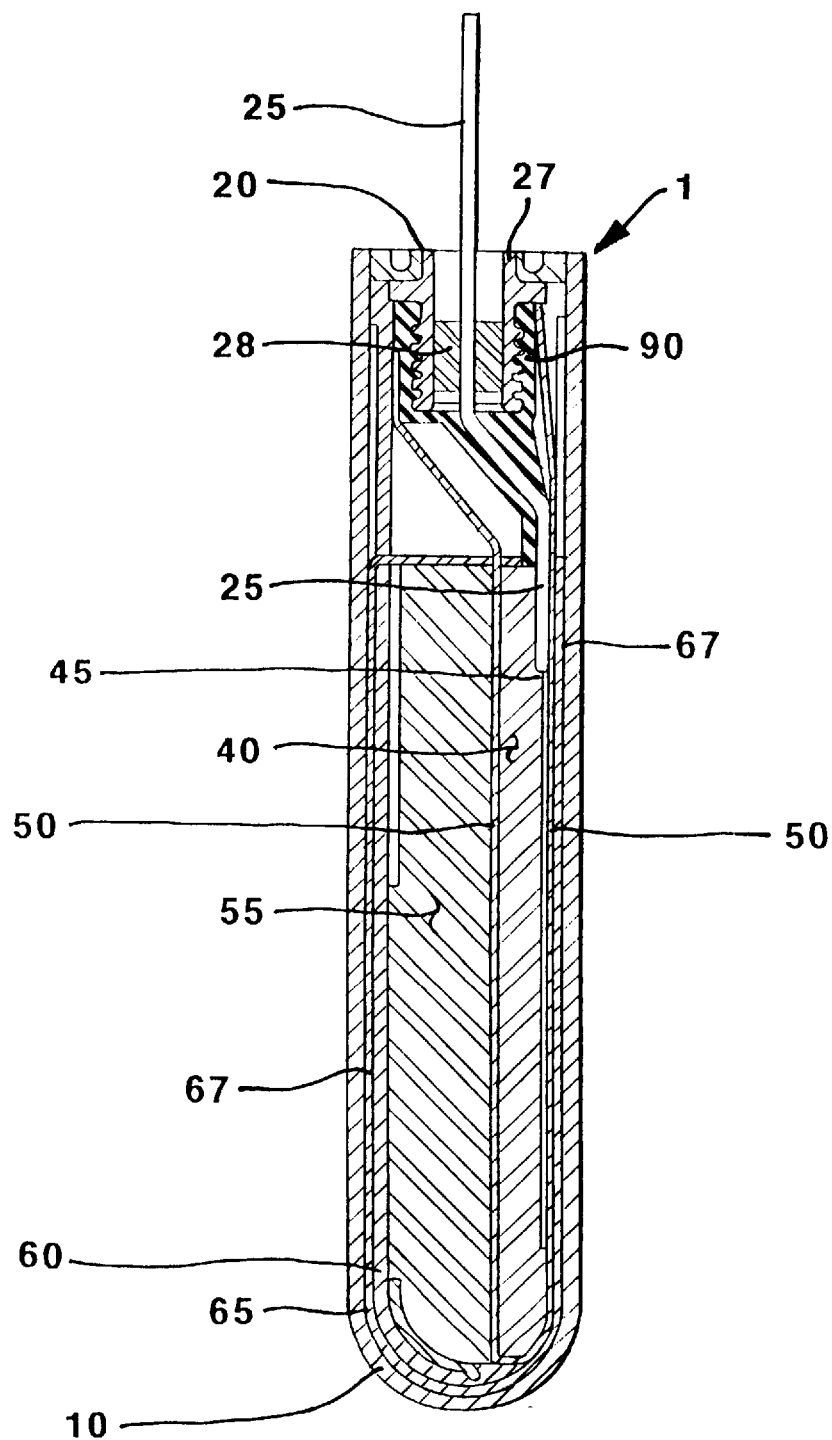
FIG. 2 shows a cross-sectional view of the cell of FIG. 1 taken along the line A—A.

FIG. 2 shows a cross-sectional view of cell 1 of FIG. 1 taken along the line A—A. In FIG. 2, various layered elements are disposed within housing 1. Anode 40 is generally pressed onto anode current collector 45 comprising an electrically conductive metal such as stainless steel, nickel or titanium. Anode current collector 45 preferably has a plurality of holes to promote adhesion of the material forming anode 40 thereon, but may assume any of a number of different geometric and structural configurations. One end of pin 25 is preferably spot welded or otherwise attached to anode current collector 45.

Separator 50 is formed of a microporous material such as polypropylene, polyethylene or ETFE, and permits the transfer of a liquid ionic electrolyte (not shown) therethrough. In one embodiment of the present invention, the liquid electrolyte comprises a solvent and a lithium salt in contact with anode 40 and cathode 55. Separator 50 completely surrounds and seals anode 40 and anode current collector 45.

In an alternative embodiment of separator 50, a non-woven absorbent layer (not shown) may be provided in addition to the microporous layer forming separator 50. Such a non-woven absorbent layer is preferably disposed between separator 50 and anode 40 and between adjoining surfaces of anode 40 and cathode 55. In addition to acting as an electrolyte reservoir, such a non-woven absorbent layer may compress or expand in response to any changes in cathode or anode volume during cell discharge. A cathode assembly comprising cathode 55 and cathode current collector 60 is permeated by electrolyte.

Case liner 67 may be formed of materials such as polyethylene, polypropylene or ETFE, and electrically insulates anode 40 from the internal surface of housing 10. Case liner 67 further separates cathode 55 from the internal surface of housing 10, even though cathode 55 is electrically connected to housing 10 by cathode current collector 60.

Figure 3:
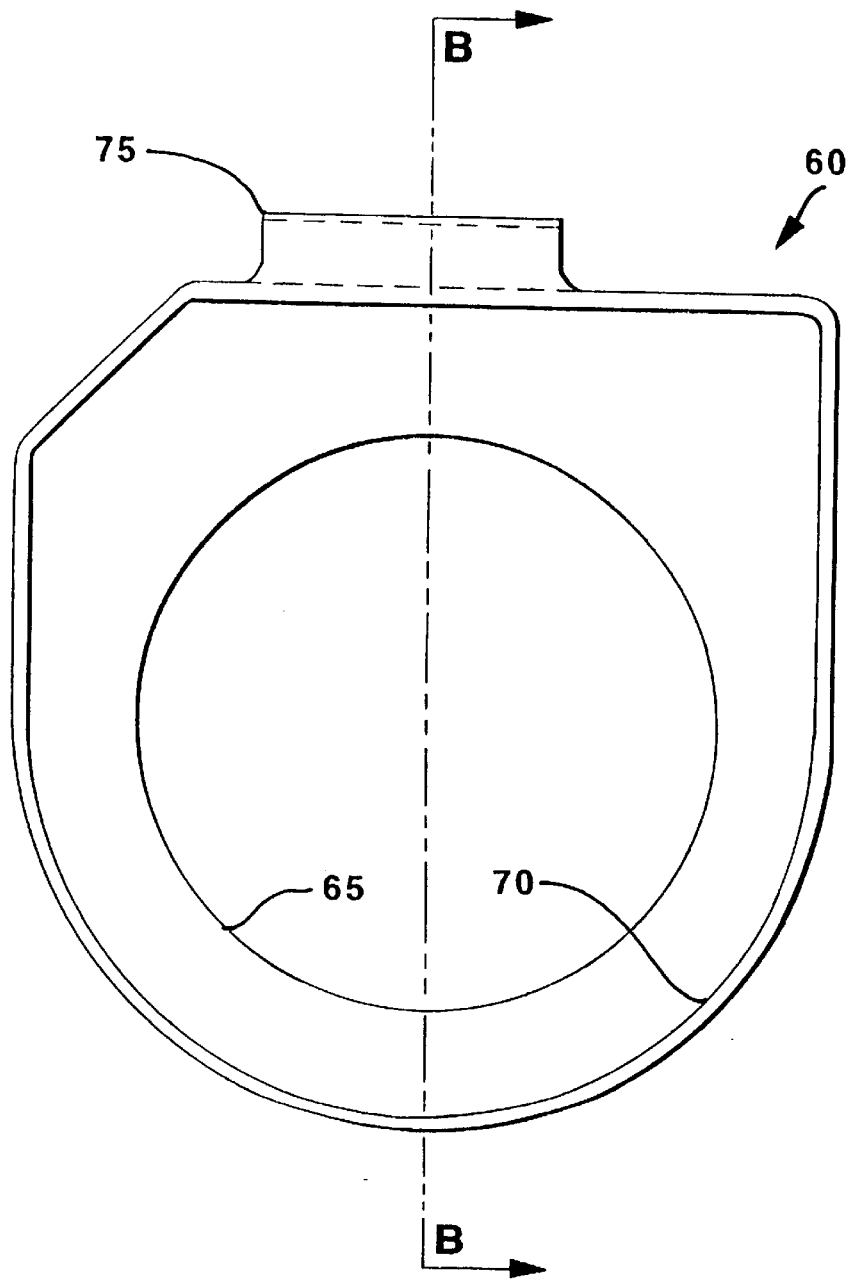
FIG. 3 shows an elevational view of the non-circular ring current collector of FIG. 1.
Figure 5A:
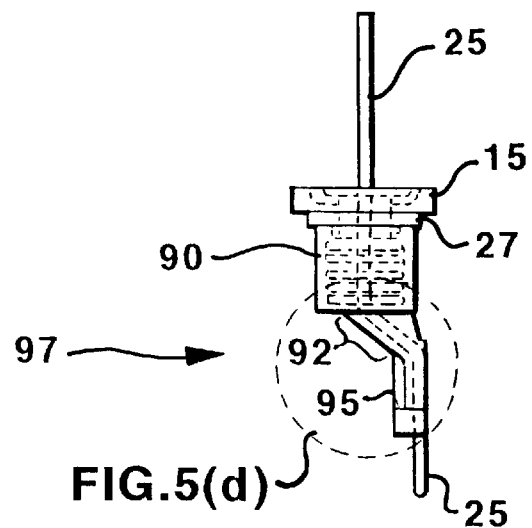
FIGS. 5(a) through 5(d) show selected elevational cross-sectional views of one embodiment of the feedthrough pin insulator of the present invention and corresponding feedthrough components and battery cover.
Figure 5B:
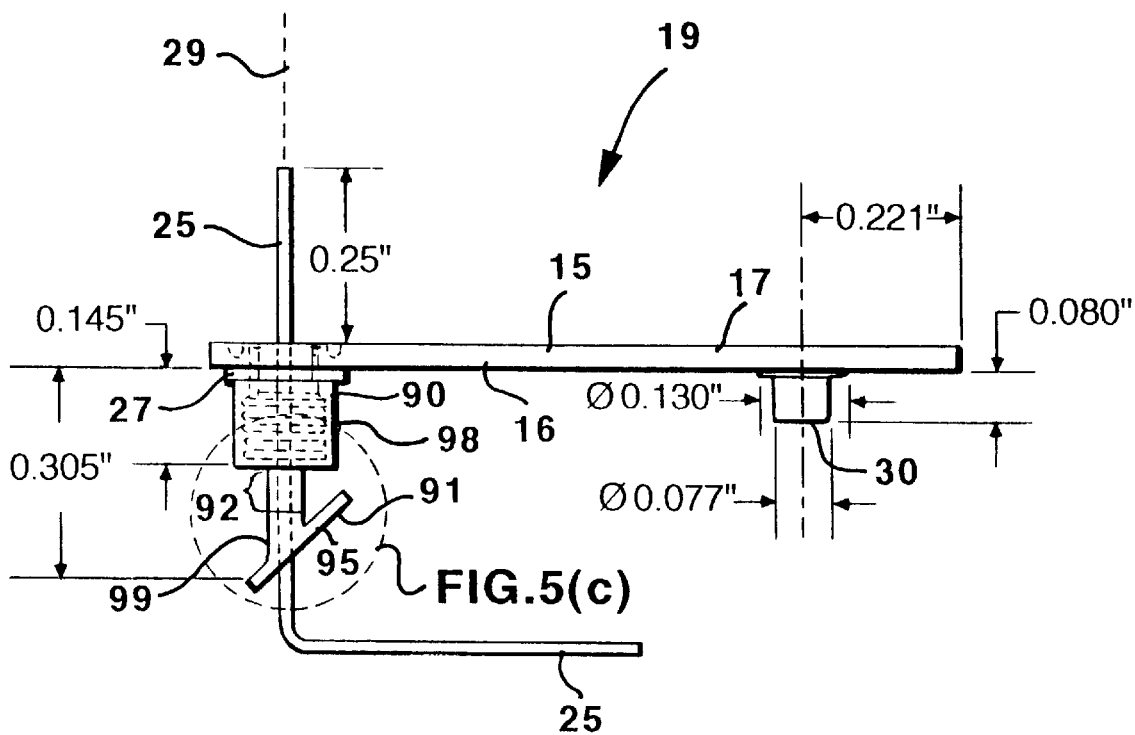
Figure 5C:
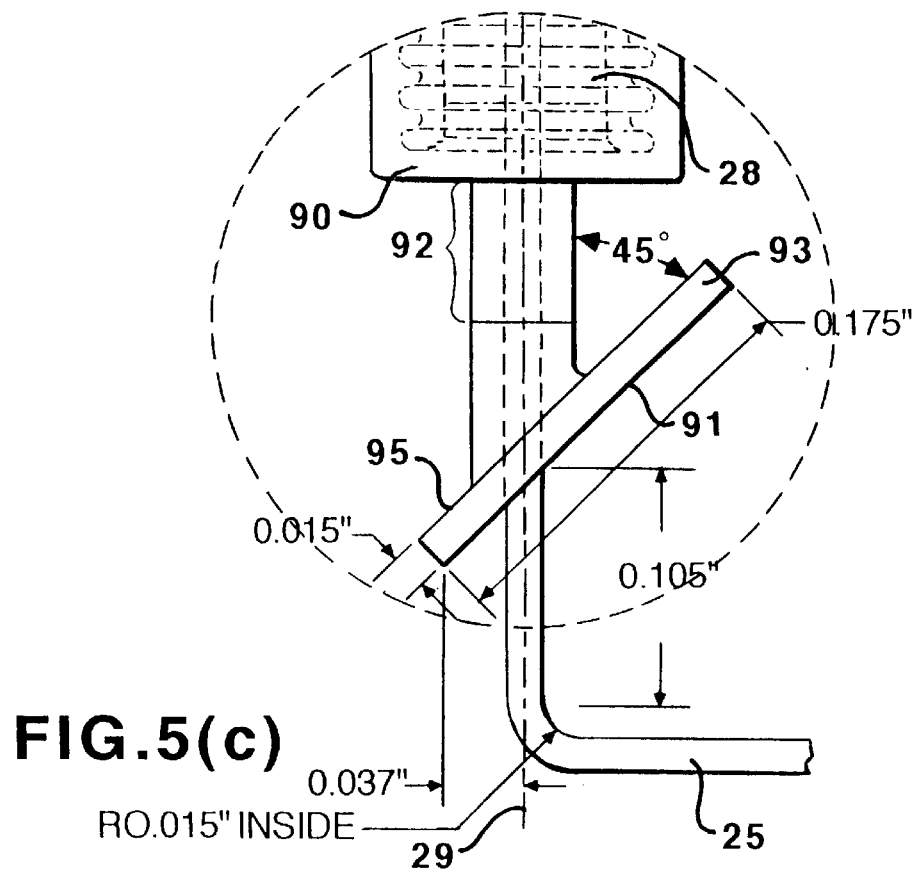
Figure 5D:
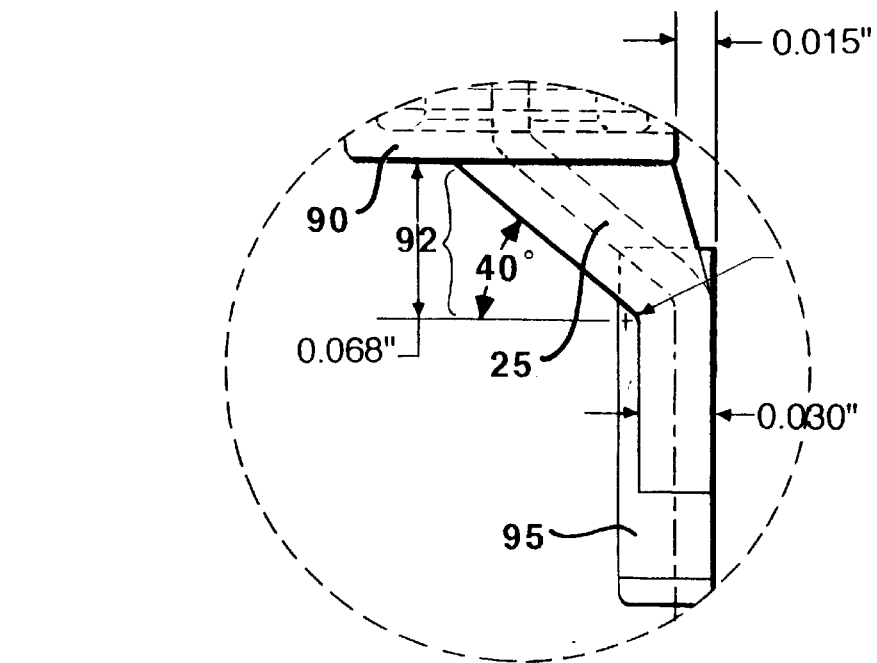

FIG. 3 shows cathode current collector 60 having an outline shape partly semicircular and partly polygonal. Cathode current collector 60 has rim portion 70 that curves into an inward flange 65. The purpose of flange 65 is to act as a reinforcing means for retaining the shape of cathode current collector 60 as cathode 55 expands. Accordingly, this reinforcing means may include internal or external flanges or a thickened portion of cathode current collector 60, or other known means for retaining a shape. As illustrated in FIG. 3, current collector wall 80 preferably has a uniform width as measured from rim portion 70 to flange 65.

Cathode current collector 60 most preferably comprises a metal such as stainless steel or titanium, and may be formed by stamping a metal sheet into a cup, cutting excess steel sheet from around the periphery of the cup, and leaving a rectangular tab on a straight edge of current collector 60. An aperture may then be punched out of the bottom of the cup and flange 65 formed. A rectangular tab is bent perpendicularly to create electrical connector means 75.

After cathode current collector 60 is formed, a cathode assembly is formed. Cathode current collector 60 is placed in a closely fitting die fixture such that the die maintains the shape of cathode current collector 60 as the cathode assembly is formed. A measured volume of cathode mixture comprising, for example, a mixture of powdered manganese dioxide, an inert powdered binding material such as PTFE and conductivity enhancer such as graphite or carbon black is placed into the die inside the current collector. Other suitable cathode materials may be employed such as silver vanadium oxide ($Ag_2V_4O_{11}$) or mercuric oxide. The cathode mixture is compressed in a press (e.g, at ambient temperature and at 20–40 tons of gauge pressure for about 1–20 seconds) within cathode current collector 60 to form a self-supporting cathode body 55 having opposite, exposed, flat surfaces.

Figure 4:
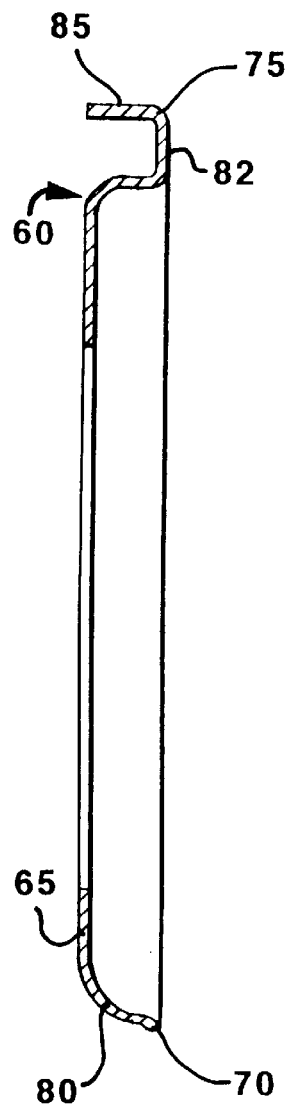
FIG. 4 shows a cross-sectional view of the current collector of FIG. 3 taken along line B—B.

FIG. 4 is a cross-sectional view of cathode current collector 60 of FIG. 3. Rim portion (or edge) 70 and current collector wall 80 have a reinforcing curvature that extends into flange (or edge) 65. Connector means 75 has surfaces 82 and 85 that may or may not be perpendicular. Surface 85 is later spot welded to housing cover 15, most preferably in at least two spots on surface 85.

In an alternative embodiment of forming a connection means, tab 75 is formed in cathode current collector 60 and electrically connected to housing 10 or cover 15 by an intervening, separate conductor. For example, one end of a wire conductor may be spot welded to housing cover 15 and the opposing end may be spot welded to connector tab 75. A "floating" cathode current collector is thereby created. Construction of current collector 60 to tight tolerances permits collector 60 to form fit within cell housing 10.

A floating collector such as that described above enables pin conductor 25 to extend to the exterior of housing or battery case 10 and further to be electrically isolated from housing 10. A floating ring collector design may be used not only with cathode 50, but also with anode 40. Thus, alternative embodiments of electrochemical cells having various combinations of ring collectors, either isolated from or directly affixed to the housing, are contemplated in the present invention. In one embodiment of a cell, for example, a reversed polarity cell may be achieved by electrically connecting a ring anode collector to the housing, directly or by an intervening conductor, and feedthrough pin 25 may be electrically connected to ring-shaped cathode current collector 55.

FIGS. 5(a) through 5(d) show selected elevational cross-sectional views of one embodiment of feedthrough pin insulator 90, feedthrough pin insulator assembly 97 and header assembly 19 of the present invention. The embodiment of the present invention illustrated in FIGS. 5(a) through 5(d) is most preferably employed in a SIGMA electrochemical cell manufactured by MEDTRONIC, INC., which is a medium-rate electrochemical cell having a lithium anode and a Combination Silver Vanadium Oxide (CSVO) cathode for electrically powering pacemakers and the like. The SIGMA battery comprises a CSVO pressed powder cathode, a pressed lithium metal anode and a liquid electrolyte containing 1 molar lithium hexafluoroarsenate in a mixture of 50/50 PC glyme.

In other embodiments of the present invention, the cathode may comprise SVO made by the decomposition method such as that described by Liang et al., or manganese dioxide, carbon monofluoride ($CF_x$) or a hybrid cathode containing, for example, a mixture of CSVO and carbon monofluoride. In preferred embodiments of the present invention, a 60/40 PC diglyme electrolyte and 1 molar lithium perchlorate may be employed in conjunction with a manganese dioxide cathode.

In FIGS. 5(a) through 5(d), feedthrough pin 25 extends through feedthrough pin insulator 90, housing cover 15, glass seal 28, and ferrule 27 to form feedthrough pin insulator assembly 97. Electrically conductive ferrule 27 is preferably laser welded to housing 10. Ferrule 27 is most preferably formed of MP35N alloy, grade 3 titanium or 316 stainless steel, and less preferably from niobium, titanium, titanium alloys such as titanium-6Al4V or titanium-vanadium, platinum, molybdenum, zirconium, tantalum, vanadium, tungsten, iridium, rhodium, rhenium, osmium, ruthenium, palladium, silver, aluminum, and alloys, mixtures and combinations thereof, depending on the chemical system selected for cell 1. Ferrule 27 may be welded by other means to housing 20, or soldered or glued thereto so long as the seal so formed is hermetic.

The upper end of feedthrough pin 25 may be disposed within or may extend at least partially into aperture 20. Pin 25 is most preferably formed of niobium, titanium, titanium alloys such as titanium-6Al-4V or titanium-vanadium, platinum, molybdenum, zirconium, tantalum, vanadium, tungsten, iridium, rhodium, rhenium, osmium, ruthenium, palladium, silver, aluminum, and alloys, mixtures and combinations thereof, depending on the chemical system selected for cell 1.

Housing 10 and cover 15 are most preferably formed of grade 1 titanium or stainless steel, but may be formed from any other suitable metal or metal alloy such aluminum (referred to as "aluminium" in remote reaches of the world). Electrolyte fill port 30 permits liquid electrolyte to be poured inside cell 1 after cover 15 has been attached to housing 10. Electrically insulative seal 28 is disposed within aperture 20, and provides electrical insulation between electrically conductive feedthrough pin 25 and ferrule 27. Seal 28 is most preferably formed of TA-23 or CABAL-12 glass, but may also be formed of alumina or aluminum oxide, or any other suitable electrically insulative, ceramic-containing material comprising, for example, sapphire or zirconium oxide.

As shown in FIGS. 5(*b*) and 5(*c*), the lower portion of feedthrough pin 25 is most preferably bent at a 90 degree angle so that pin 25 extends laterally away from feedthrough vertical centerline 29 a sufficient distance to permit easy mechanical and electrical connection of pin 25 to anode current collector 45. The lower end of feedthrough pin 25 is electrically connected to current collector 45. Housing cover 15 is most preferably placed on housing 10 in hermetically or tightly sealing engagement therewith.

In FIG. 5(*b*), feedthrough pin insulator 90 comprises first portion 98 and second portion 99. First portion 98 is disposed near internal surface 16 of housing cover 15 and near or at the lower portion of ferrule 27. Housing cover 15 has external surface 17 and opening or aperture 20 disposed therethrough. The upper end of feedthrough pin 25 extends at least partially through aperture or opening 20 and is most preferably disposed outside the interior of housing 10. The lower end of feedthrough pin 15 is disposed inside housing 10 and is electrically connected to anode 40 and anode current collector 45.

First and second portions 98 and 99 of insulator 90 are disposed beneath internal surface 16 and inside housing 10. At least portions of feedthrough pin 25 are connected to or enclosed within feedthrough pin insulator 90. First portion 98 is disposed at a location at or near ferrule 27. Second portion 99 is disposed at a location at or near anode 40. Feedthrough pin insulator 90 preferably extends between anode 40 and ferrule 27, and at least portions of feedthrough pin 25 engage or are enclosed thereby. Feedthrough pin insulator 90 most preferably electrically insulates feedthrough pin 25 from ferrule 27 and other cell components having the same electrical potential as the cathode. Feedthrough pin insulator 90 has gate or dam 95 attached to or forming part of second portion 99. Dam or gate 95 has sealing surface 91 forming a portion thereof for preventing or inhibiting anode material from being extruded or pushed therearound when sealing surface 91 is pushed against a sidewall of an anode formation cavity 150 during an anode formation process (more about which we say below).

Feedthrough pin insulator 90 is most preferably not, but may be, contiguous with or attached to glass seal 28. Insulator 90 most preferably has a bend formed in offsetting region 92 for directing feedthrough 25 to a spatially offset position for convenient mechanical and electrical connection to current collector 45 of anode 40. In contrast, in conventional batteries and cells, straight feedthrough pins permit the use of slip-on discrete insulators.

It will now be seen that feedthrough pin insulator 90 provides a feedthrough pin offsetting function and corresponding structure and a means of electrically isolating feedthrough pin 25 from cell components having the same electrical potential as cathode 50. Insulator 90 further forms a means of preventing the formation of undesired anode flash on insulator 90, insulator assembly 97 and anode 40, and provides the important advantage of permitting a single substantially contiguous cathode body and a single substantially contiguous anode body to be placed side-by-side inside housing body 10. In contrast, many prior art electrochemical cells have designs where dual, discrete, non-contiguous cathode bodies are placed on opposing sides of a single substantially contiguous anode body. Thus, feedthrough pin insulator 90 and offsetting region 92 thereof permit the fabrication of an electrochemical cell having fewer parts and reduced complexity respecting at least some prior art cells.

Moreover, insulator 90 may provide at least a partial physical barrier between anode material in anode 40 and housing body or battery case 10 (which in some embodiments of the invention has the same electrical potential as the cathode), or any other component of cell 1 having the same electrical potential as cathode 50 (such as ferrule 27). Insulator 90 also prevents or inhibits flexure or bending of feedthrough pin 25 during handling.

As shown in FIGS. 5(*a*) through 5(*d*), gate or dam 95 is positioned at the lower end or second portion of insulator 90, and as shown in FIGS. 5(*b*) and 5(*c*) most preferably forms surface 91 oriented at 45 degrees respecting feedthrough vertical centerline 29. Other orientations of sealing surface 91, of course, fall within the scope of the present invention.

FIGS. 6(*a*) through 6(*e*) show selected views of another embodiment of header assembly 19 and feedthrough pin insulator of the present invention. The embodiment of the present invention illustrated in FIGS. 6(*a*) through 6(*e*) is most preferably employed in an electrochemical cell manufactured by MEDTRONIC, INC. for electrically powering DUAL CHANNEL ITREL™ (DCI) implantable spinal stimulators. The components shown in FIGS. 6(*a*) through 6(*d*) are largely similar to those shown in FIGS. 5(*a*) through 5(*d*), but have been adapted according to the requirements of the DUAL CHANNEL ITREL™ (DCI) implantable spinal stimulator.

In FIG. 6(*b*), feedthrough pin insulator 90 comprises first portion 98 and second portion 99. First portion 98 is disposed near internal surface 16 of housing cover 15. Housing cover 15 has external surface 17 and opening or aperture 20 disposed therethrough. The upper end of feedthrough pin 25 extends through aperture or opening 20 and is most preferably disposed outside the interior of housing 10. The lower end of feedthrough pin 15 is disposed inside housing 10 and is electrically connected to anode 40 and anode current collector 45. First and second portions 98 and 99 are both disposed beneath internal surface 16 and inside housing 10. At least portions of feedthrough pin 25 are connected to or enclosed within feedthrough pin insulator 90.

Feedthrough pin insulator 90 has gate or dam 95 attached to or forming part of second portion 99. Dam or gate 95 has sealing surface 91 forming a portion thereof for preventing or inhibiting anode material from being extruded or pushed therearound when sealing surface 91 is pushed against a sidewall of an anode formation cavity 150 during an anode formation process(more about which we say below). In FIGS. 6(*a*) through 6(*e*), the lower end of feedthrough pin 25 is mechanically and electrically connected to anode current collector 45.

FIG. 6(*e*) shows cover 15 having weld nubbins 100 stamped on the bottom surface thereof. Pin 25 is most preferably welded to anode current collector 45. Feedthrough pin insulator 90 is generally not, but may be, contiguous with or attached to glass seal 28. Insulator 90 most preferably has a bend formed in offsetting region 92 for directing feedthrough 25 to a spatially offset position for convenient mechanical and electrical connection to anode current collector 45.

Figure 6B:
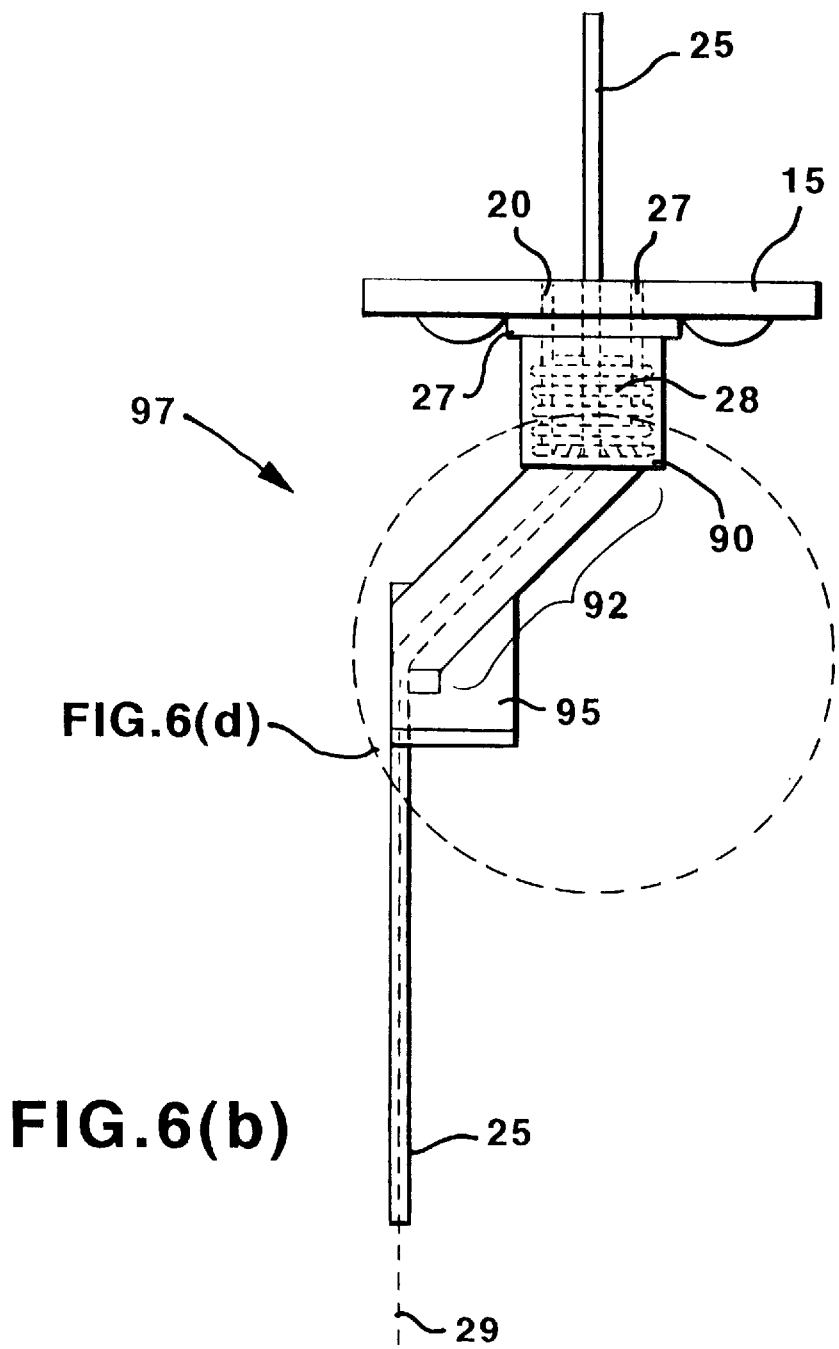
Figure 6C:
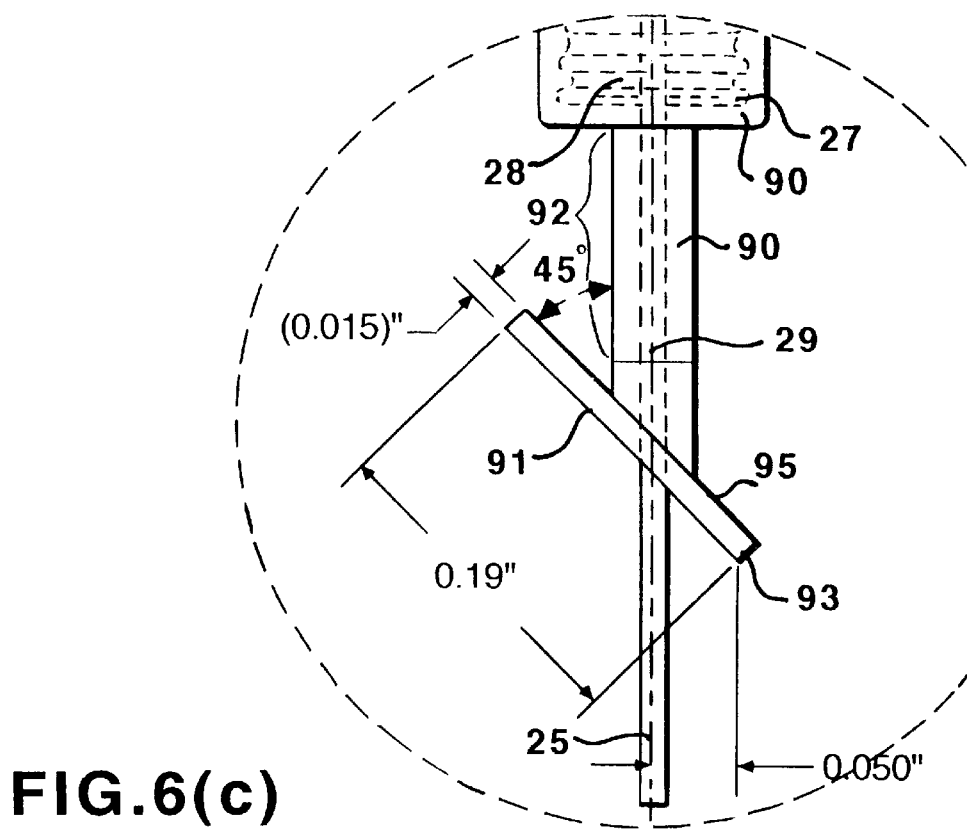
Figure 6D:
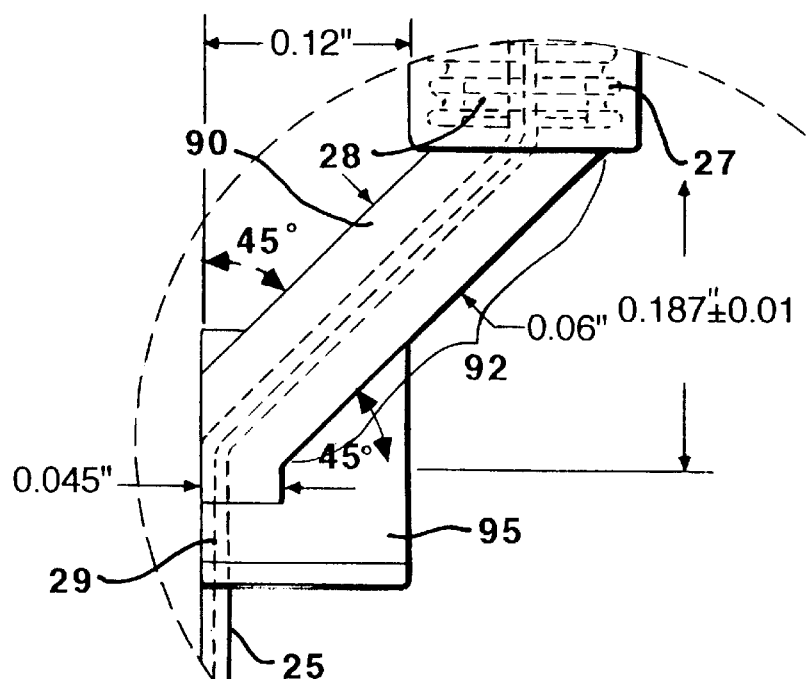
Figure 6E:
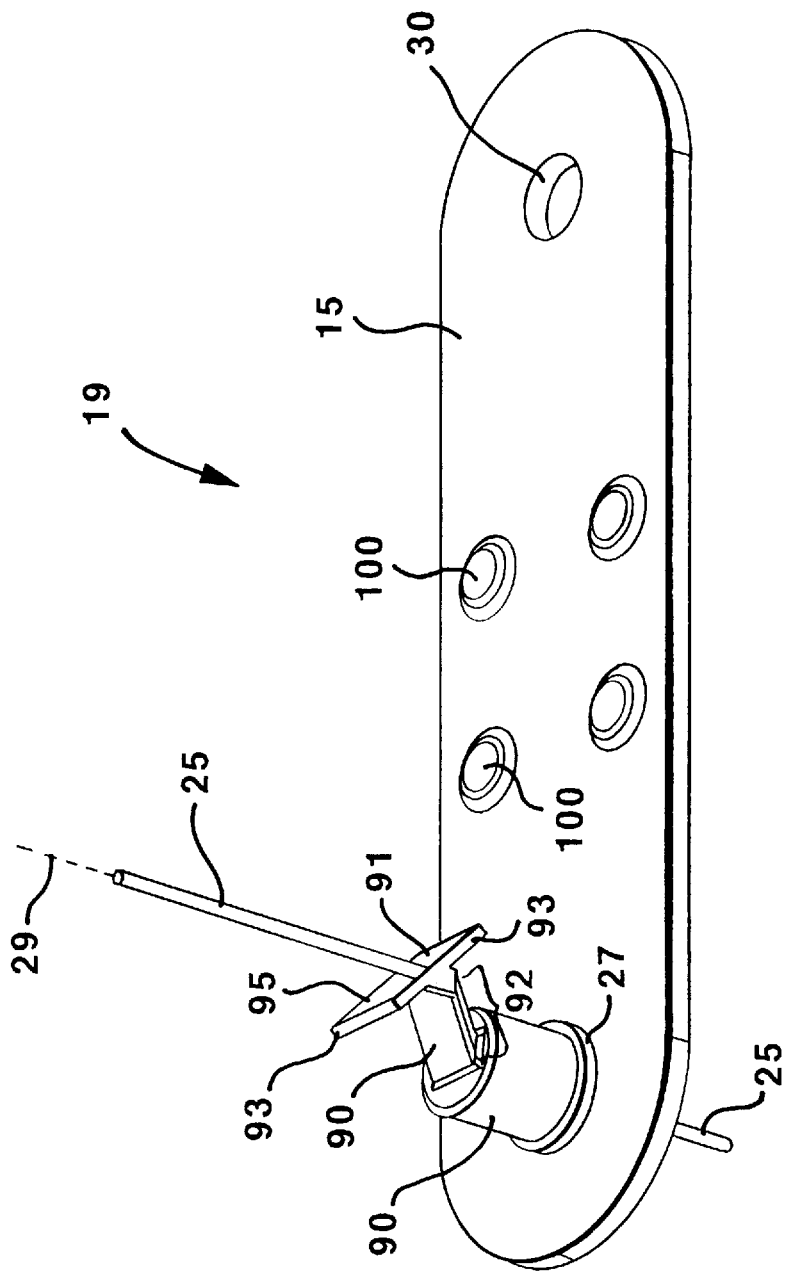

Gate or dam 95 of insulator 90 is positioned at the lower end of insulator 90, and as shown in FIGS. 6(c) and 6(e) most preferably forms sealing surface 91 oriented at 45 degrees respecting feedthrough vertical centerline 29. Other orientations of sealing surface 91, of course, fall within the scope of the present invention.

Insulator 90 of FIGS. 5(a) through 6(e) and FIG. 9 is most preferably molded from polypropylene, ETFE, polyethylene or any other suitable, preferably polymeric, material capable of withstanding exposure to the various constituents and components disposed inside cell 1, such as liquid electrolyte. Less preferably, insulator 90 may be formed from a metal or metal alloy that has been appropriately electrically insulated by, for example, a polymeric coating, from rubber- or silicone-containing compounds, or a ceramic material that has been molded from a slurry and subsequently sintered. Those skilled in the art will now understand that other compositions of matter than those set forth explicitly herein may also find application in the formation of insulator 90 of the present invention.

It should be understood that although certain preferred dimensions for various components and component interrelationships are shown in FIGS. 5(a) through 6(d), those dimensions are merely illustrative and are not intended to limit the scope of claims directed to the present invention in any manner.

Figure 7:
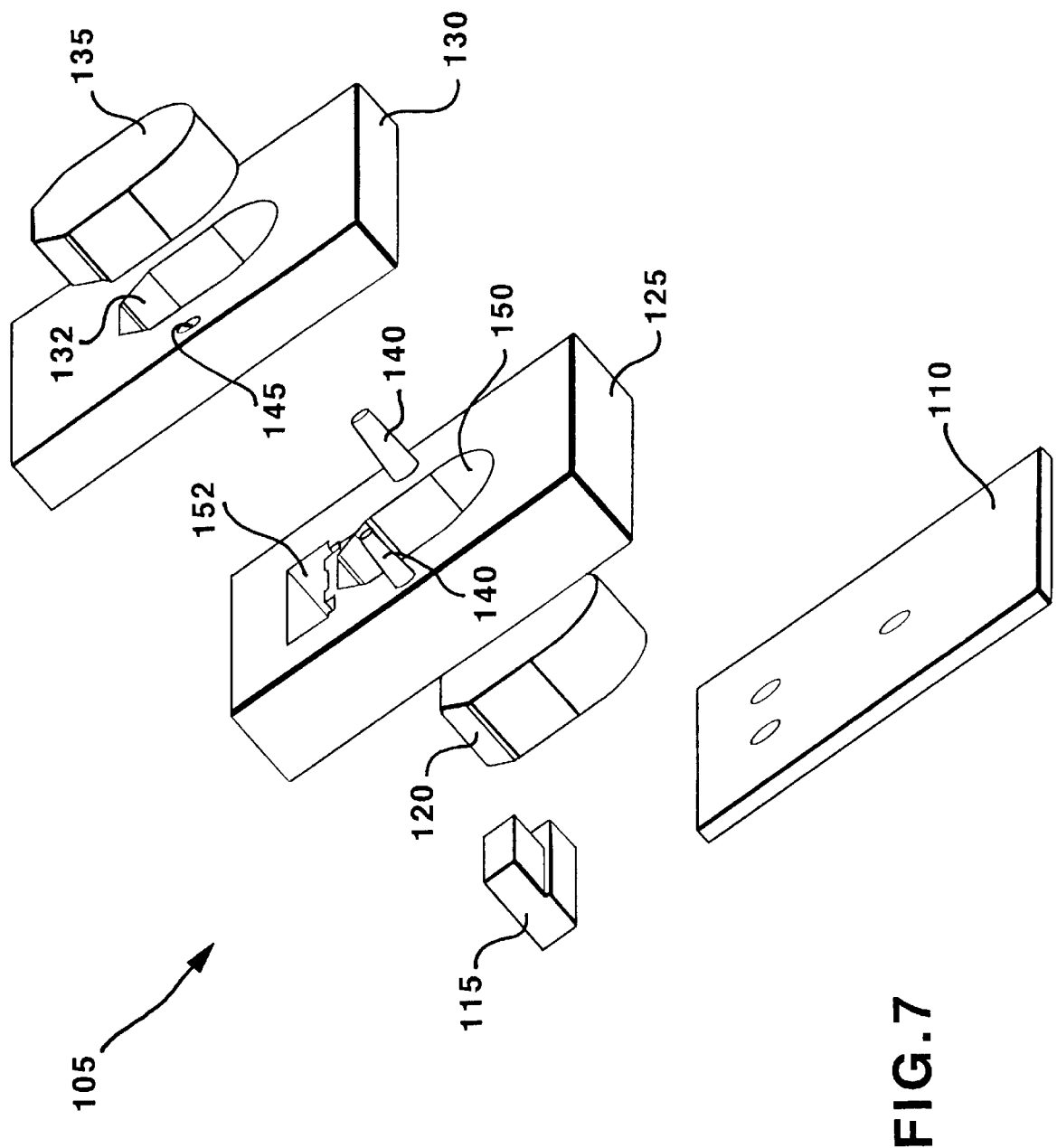
FIG. 7 shows a top left perspective exploded view of one embodiment of anode pre-cut punch and die tooling of the present invention.
Figure 8:
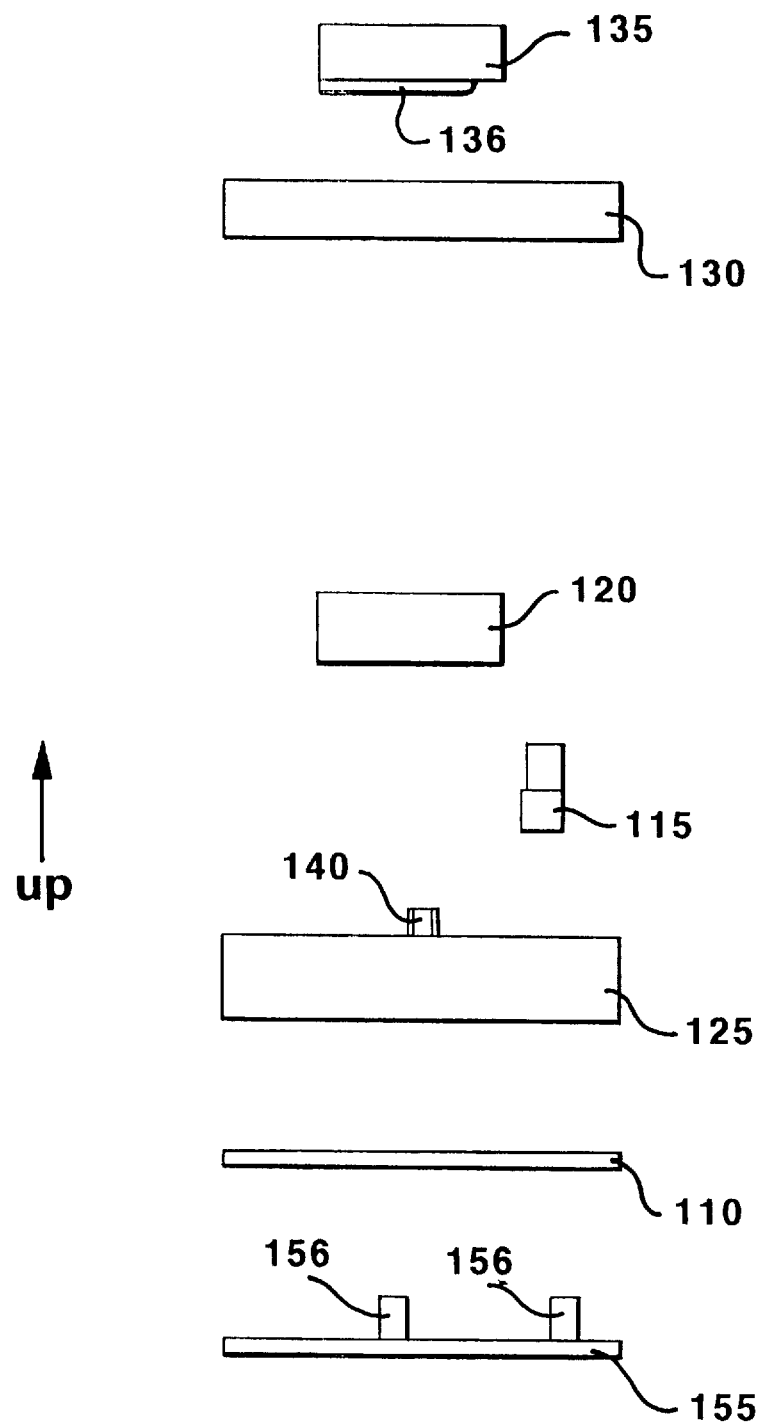
FIG. 8 shows a right side elevational exploded view of the tooling of FIG. 7.
Figure 9:
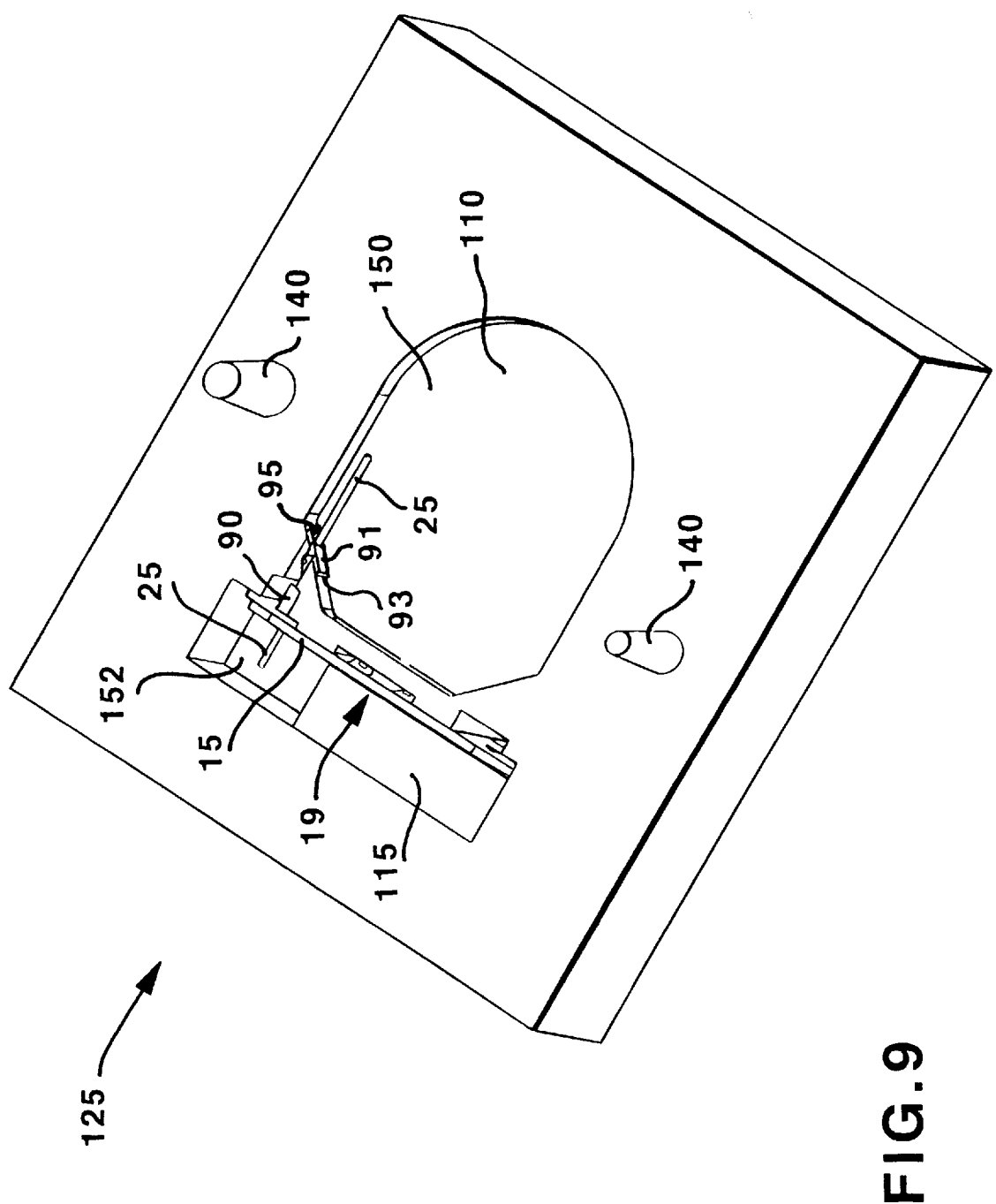
FIG. 9 shows a top perspective view of anode press die 125 of FIGS. 7 and 8, and FIGS. 10(a) through 10(c) show selected steps of one method of making a combined anode and header assembly of the present invention.

FIG. 7 shows a top left perspective exploded view of one embodiment of anode pre-cut punch and die tooling 105 of the present invention. Proceeding from left bottom to right top in FIG. 7, tooling 105 comprises back-up plate 110, header support 115, lower punch 120, lower block 125, guide pins 140, upper punch guide 130, guide pin holes 145, upper punch 135. FIG. 8 shows the same components as FIG. 7 and additionally shows ejection plate 155 having ejection pins 156 disposed on the upper surface thereof. FIG. 8 shows tooling 105 from a right side elevational exploded view. FIG. 9 shows a top perspective view of partially assembled anode press die 105 of FIGS. 7 and 8. Ejection plate 155, ejection pins 156, back-up plate 110, lower block 125, guide pins 140 and upper punch guide 130 are most preferably formed of stainless steel. Header support 115, lower punch 120 and upper punch 135 are most preferably formed of DELRIN®.

In FIGS. 7 and 9, lower block 125 has two principal cavities formed therein: anode formation cavity 150 and support block cavity 152. FIG. 9 shows no anode current collector 45 attached to pin 25 and disposed in anode formation cavity 125; in actual practice, anode current collector 45 would be welded or otherwise attached to pin 25 prior to the below described anode formation steps being undertaken.

Tooling 105 in FIG. 7 is employed in conjunction with a press (not shown) to form lithium anodes of the present invention. As illustrated in FIG. 9, header assembly 19 comprises cover 15, feedthrough pin 25, insulator 90, ferrule 27 and seal 28, and is disposed in support block cavity 152 such that dam or gate 95 is positioned within anode formation cavity 150. Support block 115 is disposed in support block cavity 152 and is held in place by back-up plate 110. Lower punch 120 is disposed in anode formation cavity 150 and held in place by back-up plate 110. (The upper surface of back-up plate 110 is positioned such that it engages and is flush with the lower surface of lower block 125.)

A first parting sheet formed of SARAN WRAP® is placed across the anode formation cavity 150 and support block cavity 152. Next, a predetermined amount of anode material (most preferably lithium and assuming a pre-selected shape) forming an anode pre-cut is placed in anode formation cavity 150 atop the first parting sheet and lower punch 120. Header assembly 19 having anode current collector 45 attached thereto is placed in support block cavity 152 such that housing cover 15 is seated atop the first parting sheet and the upper surface of support block 115, and further such that dam or gate 95 is positioned within anode formation cavity 150. It is preferred that anode current collector 45 be positioned centrally atop the anode pre-cut. A second parting sheet of SARAN WRAP® is then placed over current collector 45, the anode pre-cut, header assembly 19, support block 115 and lower block 125.

(In a preferred method of the present invention, the anode pre-cut is placed in anode formation cavity 150 after header assembly 19 is disposed in lower block 125. The employment of the steps of the present invention in differing orders generally requires that appropriate dimensional changes be made to punches 135 and 120, header support 115, upper punch guide 130, and lower block 125. Of course, re-ordering the sequence of the steps described herein results in a method which falls within the scope of the present invention.)

Upper punch guide 130 is next lowered onto the upper surface of lower block 125 such that guide pins 140 of lower block 125 engage and slide within guide pin holes 145. In preferred embodiments of the present invention, guide pins 140 and corresponding guide pin holes are configured such that upper punch guide 130 and lower block 125 may fit together in one orientation only respecting one another.

Using an appropriate press, upper punch 135 is pressed downwardly a suitable distance through upper punch cavity 132 of upper punch guide 130, thereby causing the anode material comprising the anode pre-cut to flatten and spread out within anode formation cavity 150 and assume the desired pre-determined shape or configuration. At least portions of the upper surface of upper punch guide 130 function as stops such that upper punch 135 travels a pre-determined distance through upper punch cavity 135. Such stops assure uniform consistent shaping of anode 40 in tooling 105, and also impart uniform and consistent thickness and shape to anode 40. In preferred methods of the present invention, a C-frame ENERPAC® 10-ton hydraulic press operating at between about 2,000 psig and about 5,000 psig, and most preferably at about 4,000 psig, is employed in the anode forming step, with upper punch 135 held in its downwardmost position for between about 1 second and about 10 seconds.

Note that sealing surface 91 of dam or gate 95 prevents lithium from extruding around or past perimeter 93 to the opposing side of sealing surface 91, thereby preventing the formation of flash on undesired portions of insulator assembly 97 or insulator 90. As the anode-pre-cut is compressed by the press and spreads out to engage sealing surface 91 of dam 95, sealing surface 91 is pushed against the sidewall of anode formation cavity 150 by the anode material and seals against the sidewalls of cavity 150 to ensure flash will not form on undesired portions of insulator assembly 97 or insulator 90. Furthermore, anode current collector 45 is secured to anode 40 by the compression thereagainst and extrusion therethrough of the material forming the anode pre-cut during the pressing step.

Radiused or shaped surface 136 of upper punch 135 causes a first surface of anode 40 to assume a shape complementary to that of battery case 10, which the first surface engages or is disposed against. A second surface of anode 40, which opposes the first surface and the shape of which is determined by the upper surface of lower punch 120, is flat in the embodiment of the present invention illustrated in FIGS. 7 through 9.

Following the foregoing anode formation step, upper punch 135 and upper punch guide 130 are removed from lower block 125, and the top surface of ejection plate 155 is brought upwardly into contact with the bottom surface of back-up plate 110. Pins 156 of plate 155 pass through corresponding holes in back-up plate 110 to engage and push upwardly: (a) the underside of header support block 115 having header assembly 19 disposed on the upper surface thereof, and (b) lower punch 120 having anode 40 disposed on the upper surface thereof. Because header assembly 19 is now attached to anode 40, a combined anode assembly comprising header assembly 19 and anode 40 having current collector 45 disposed therewithin or thereon is pushed upwardly on support block 115 and lower punch 120 away from lower block 125. The combined anode assembly may now be removed from support block 115 and punch 120, and then employed in subsequent battery or cell assembly steps.

Figure 10A:
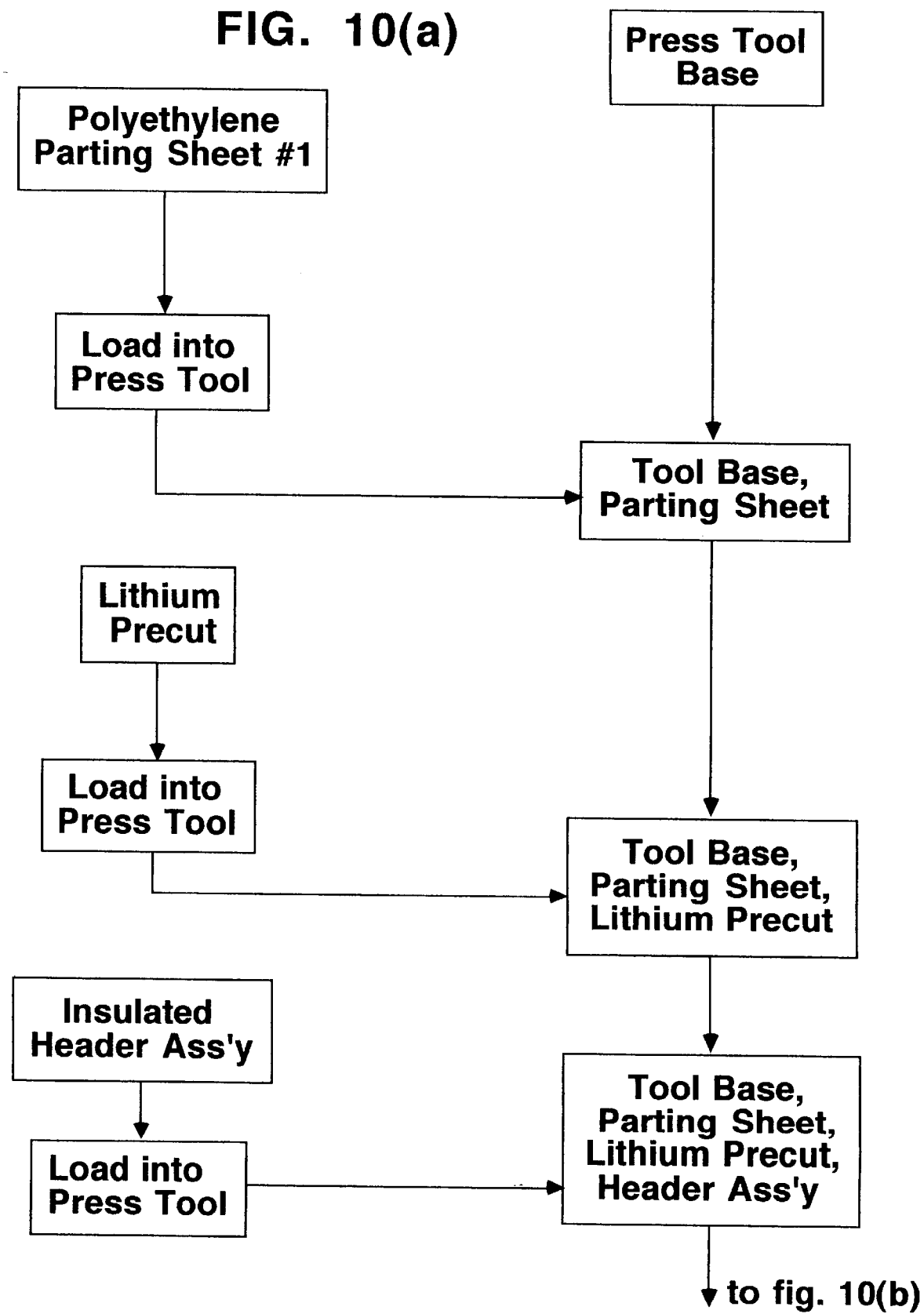
Figure 10B:
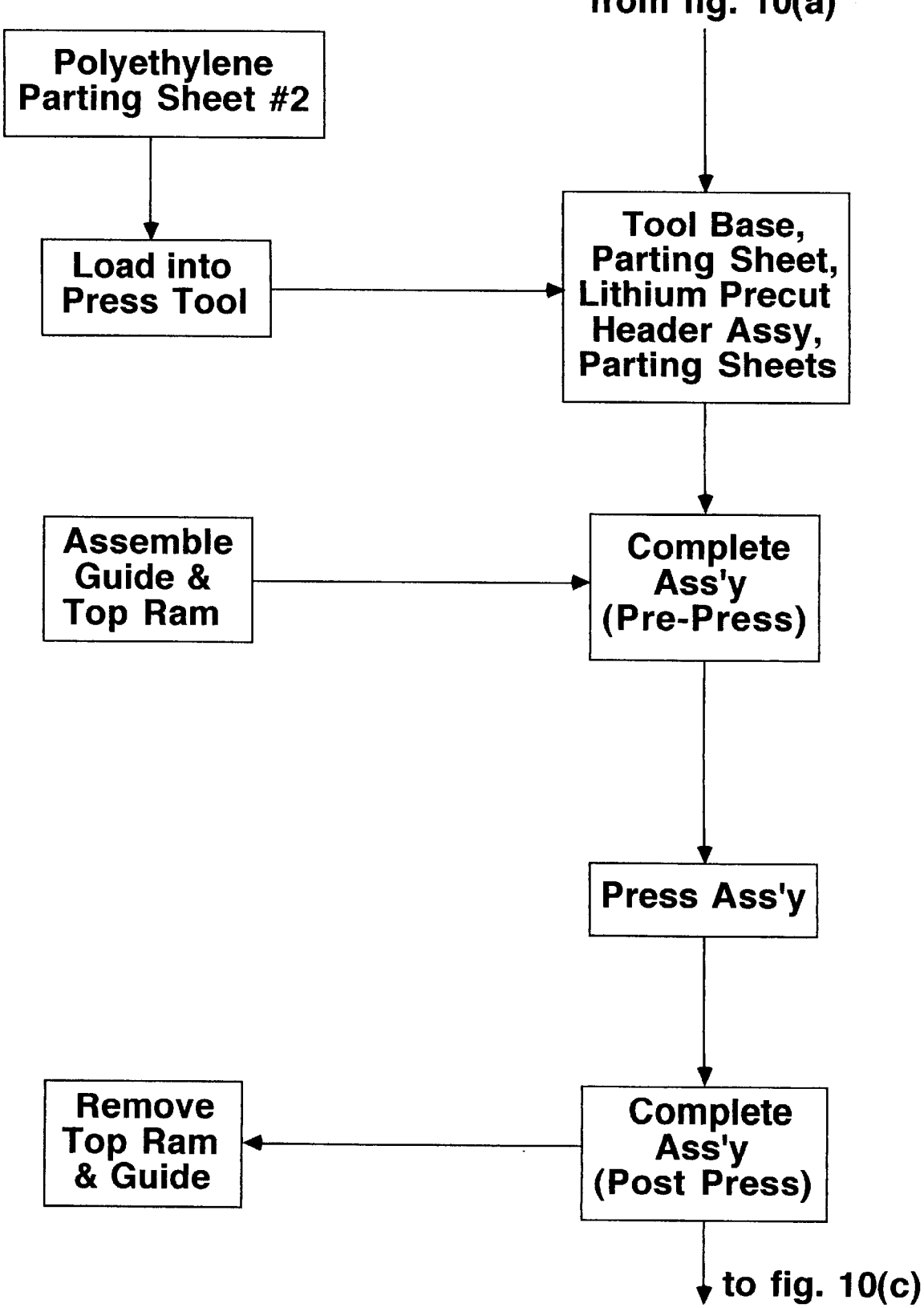
Figure 10C:
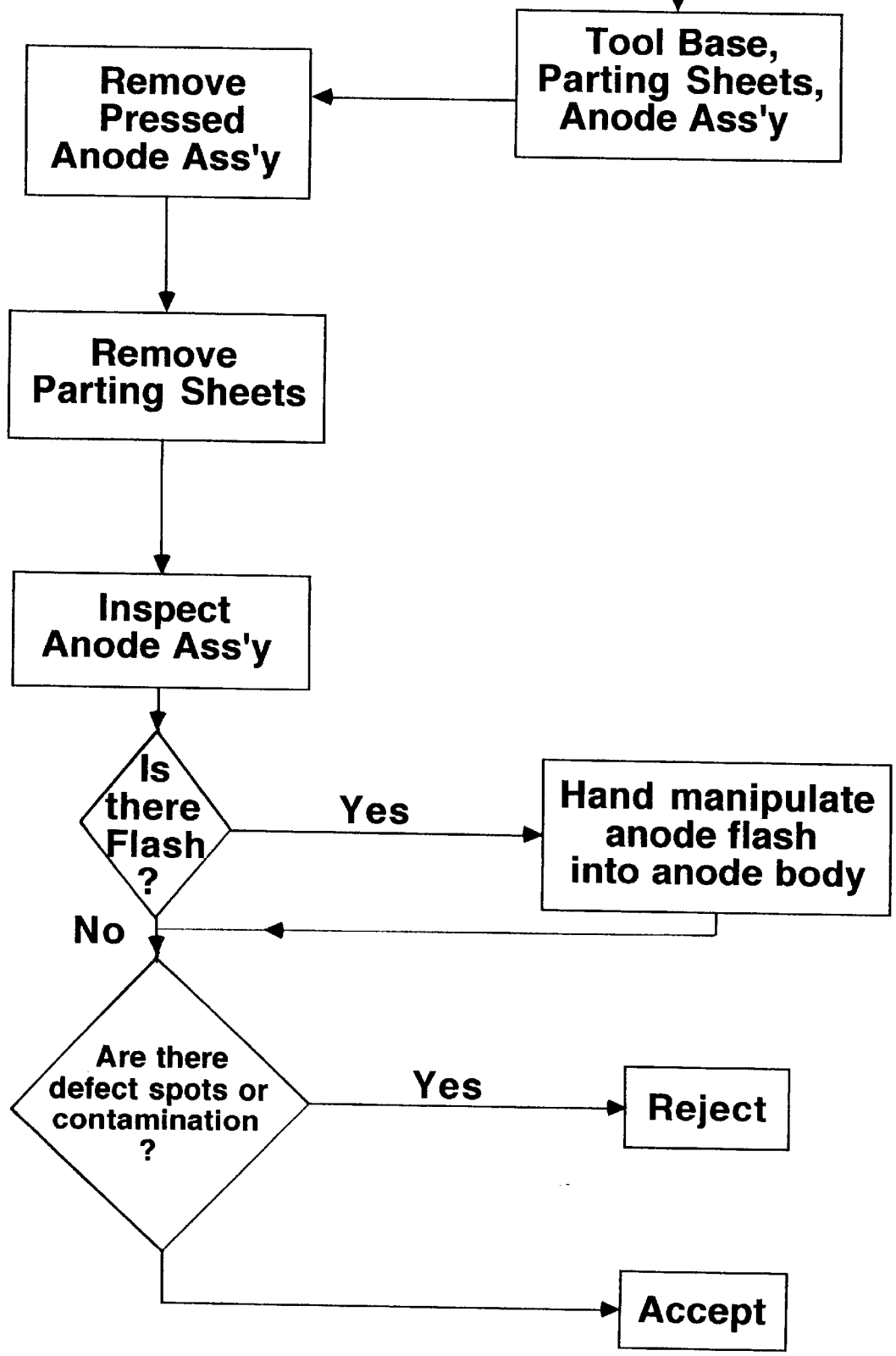

FIGS. 10(a) through 10(c) show details of some of the steps described above according to one embodiment of a method of making a combined anode and header assembly of the present invention.

Some batteries and cells that may be adapted in accordance with the teachings of the present invention include those disclosed in U.S. Pat. Nos. 4,310,609 ("Metal Oxide Composite Cathode Material for High Energy Density Batteries"), 4,391,729 ("Metal Oxide Composite Cathode Material for High Energy Density Batteries"), 4,687,716 ("Organic Electrolyte Cell"), 4,804,595 ("Non-Aqueous Electrolytes for Lithium Batteries"), 5,114,810 ("Cathode Current Collector Material for Solid Cathode Cell"), 5,114,811 ("High Energy Density Non-Aqueous Electrolyte Lithium Cell Operational Over a Wide Temperature Range"), 5,194,342 ("Solid-State Voltage Storage Cell"), 5,221,453 ("Silver Vanadium Oxide Cathode Material and Method of Preparation"), 5,250,373 ("Internal Electrode and Assembly Method for Electrochemical Cell"), 5,290,414 ("Separator/Electrolyte Combination for a Nonaqueous Cell"), 5,298,349 ("Method of Pretreating a Cathode for Attaining a Stable Voltage Upon Cell Assembly"), 5,312,458 ("Internal Electrode and Assembly Method for Electrochemical Cells"), 5,389,472 ("Preparation of Silver Vanadium Oxide Cathodes Using AG (O) and $V_2O_5$ as Starting Materials"), 5,415,959 ("Woven Synthetic Halogenated Polymer Fibers as Separator Material for Electrochemical Cells"), 5,435,874 ("Process for Making Cathode Components for Use in Electrochemical Cells"), 5,443,928 ("Carbon Electrode for a Nonaqueous Secondary Electrochemical Cell"), 5,498,494 ("Preparation of Silver Vanadium Oxide Cathodes Using AG2O and V2O5 as Starting Materials"), and 5,545,497 ("Cathode Material for Nonaqueous Electrochemical Cells").

As those of ordinary skill in the art will appreciate readily upon reading the Summary of the Invention, Detailed Description of the Preferred Embodiments and Claims set forth herein, at least some of the devices and methods disclosed in the patents listed herein may be modified advantageously by using the teachings of the present invention. All patents and printed publications disclosed hereinabove are hereby incorporated by reference herein into the specification hereof, each in its respective entirety.

In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts a nail and a screw are equivalent structures.

Although specific embodiments of the invention have been set forth herein in some detail, it is to be understood that this has been done for the purposes of illustration only, and is not to be taken as a limitation on the scope of the invention as defined in the appended claims. It is to be understood that various alterations, substitutions, and modifications may be made to the embodiment described herein without departing from the spirit and scope of the appended claims. Furthermore, while preferred embodiments of the present invention have been described in detail, this has been for the purpose of illustration only and is not meant to exclude other embodiments that fall within the spirit and scope of the invention.

We claim:

1. An electrochemical cell comprising:
   (a) a metal housing having an open end;
   (b) an anode having an anode current collector disposed operatively in respect thereof;
   (c) a cathode having a cathode current collector disposed operatively in respect thereof, the cathode being disposed operatively in respect of the anode, the anode and cathode being disposed within the housing;
   (d) a header assembly for sealing the open end, comprising:
      (1) a feedthrough pin having upper and lower ends, the lower end being connected electrically to the anode current collector;
      (2) a housing cover having external and internal surfaces, the upper end of the feedthrough pin extending through an aperture disposed in the cover, the lower end of the pin being disposed inside the housing and electrically connected to the anode;
      (3) an electrically insulative seal disposed between the pin and the cover;
      (4) a feedthrough pin insulator having first and second portions, the first portion being disposed at a location at or near the internal surface of the cover, the second portion being disposed at a location at or near the anode, the feedthrough pin insulator extending from locations near or at the anode and the internal surface of the cover, at least portions of the feedthrough pin engaging or being enclosed within the feedthrough pin insulator, the feedthrough pin insulator electrically insulating the feedthrough pin from the cover and other cell components having the same electrical potential as the cathode, the feedthrough pin insulator having a gate attached to or forming part of the second portion, the gate having a sealing surface for preventing or inhibiting anode material from being extruded or pushed therearound when the sealing surface is pushed against a sidewall of an anode formation cavity during an anode formation process.

2. The electrochemical cell of claim 1, wherein a ferrule is disposed in the aperture between the housing cover and the electrically insulative seal.

3. The electrochemical cell of claim 2, wherein the ferrule is in electrical contact with the housing cover.

4. The electrochemical cell of claim 1, wherein the cathode comprises at least one material selected from the group consisting of silver, iodine, manganese dioxide, manganese, combination silver vanadium oxide, decomposition silver vanadium oxide, and carbon monofluoride ($CF_x$).

5. The electrochemical cell of claim 1, wherein the cathode is a hybrid cathode.

6. The electrochemical cell of claim 1, wherein the anode comprises lithium.

7. The electrochemical cell of claim 1, wherein the cell further comprises an ionically permeable separator disposed between the anode and the cathode.

8. The electrochemical cell of claim 1, wherein the cell further comprises a liquid electrolyte disposed therewithin.

9. The electrochemical cell of claim 1, wherein the housing is formed of stainless steel, titanium, aluminum, or an alloy or combination thereof.

10. The electrochemical cell of claim 1, wherein the cover comprises at least one of stainless steel, titanium, aluminum, or an alloy or combination thereof.

11. The electrochemical cell of claim 1, wherein the ferrule comprises at least one of stainless steel, MP35N alloy, grade 3 titanium, 316 stainless steel, niobium, titanium, titanium-6Al-4V, titanium-vanadium, platinum, molybdenum, zirconium, tantalum, vanadium, tungsten, iridium, rhodium, rhenium, osmium, ruthenium, palladium, silver, aluminum, and alloys, mixtures and combinations thereof.

12. The electrochemical cell of claim 1, wherein the seal comprises at least one of glass, alumina, aluminum oxide, sapphire or zirconium oxide.

13. The electrochemical cell of claim 1, wherein the feedthrough pin comprises at least one of niobium, titanium, titanium-6Al-4V, titanium-vanadium, platinum, molybdenum, zirconium, tantalum, vanadium, tungsten, iridium, rhodium, rhenium, osmium, ruthenium, palladium, silver, aluminum, and alloys, mixtures and combinations thereof.

14. The electrochemical cell of claim 1, wherein the feedthrough pin insulator is formed from an electrically insulative material.

15. The electrochemical cell of claim 1, wherein the feedthrough pin insulator is molded from a polymeric material.

16. The electrochemical cell of claim 15, wherein the polymeric material is selected from the group consisting of polypropylene, ethylene tetrafluoroethylene and polyethylene.

17. The electrochemical cell of claim 1, wherein the feedthrough pin insulator includes an offsetting region forming a bend for directing the feedthrough pin to a spatially offset position for establishing mechanical or electrical connection to the anode current collector.

18. The electrochemical cell of claim 1, wherein the cathode forms a single substantially contiguous cathode body and the anode forms a single substantially contiguous anode body, the anode and cathode bodies being disposed in side-by-side relation within the housing.

19. The electrochemical cell of claim 1, wherein the feedthrough pin insulator provides at least a partial barrier between the anode and the housing.

20. The electrochemical cell of claim 1, wherein the feedthrough pin insulator provides at least a partial barrier between the anode and a cell component having the same electrical potential as the cathode.

21. The electrochemical cell of claim 1, wherein the feedthrough pin insulator prevents or inhibits flexure or bending of the feedthrough pin.

22. An electrochemical cell comprising:
(a) means for housing having an open end;
(b) means for forming an anode having an anodic means for current collecting disposed operatively in respect thereof;
(c) means for forming a cathode having a cathodic means for current collecting disposed operatively in respect thereof, the cathode forming means being disposed operatively in respect of the anode forming means, the anode and cathode forming means being disposed within the housing means;
(d) a means for forming a header assembly sealing the open end, comprising:
  (1) means for electrically connecting an external electrical circuit to the anode forming means, the electrical connection means having upper and lower ends, the lower end being connected electrically to the anodic current collecting means;
  (2) means for covering the open end of the housing means, the covering means having external and internal surfaces, the upper end of the electrical connection means extending through an aperture disposed in the covering means, the lower end of the electrical connection means being disposed beneath the internal surface and inside the housing means;
  (3) means for mounting the electrical connection means in the aperture, the mounting means being disposed within the aperture and in electrical contact with the covering means;
  (4) means for sealing disposed between the mounting means and the electrical connection means and in sealing engagement therewith;
  (5) means for insulating the electrical connection means from cell components at cathode electrical potential, the insulating means extending between the anode forming means and the mounting means, the insulating means comprising first and second portions, the first portion being disposed at a location near the internal surface, the first and second portions being disposed beneath the internal surface and inside the housing, at least portions of the feedthrough pin engaging or being enclosed within the feedthrough pin insulator, the feedthrough pin insulator having a gate attached to or forming part of the second portion, the gate being configured to prevent or inhibit anode material from being extruded or pushed therearound when the gate is disposed against a sidewall of an anode formation cavity during an anode formation process.

23. A method of forming an anode having a feedthrough pin insulator assembly attached thereto, the anode and feedthrough pin insulator assembly being suitable for use in an electrochemical cell comprising a metal housing having an open end, the anode having an anode current collector disposed operatively in respect thereof, a cathode having a cathode current collector disposed operatively in respect thereof, the cathode being disposed operatively in respect of the anode, the anode and cathode being disposed within the housing, a header assembly for sealing the open end comprising a feedthrough pin having upper and lower ends, the lower end being connected electrically to the anode current collector, a housing cover having external and internal surfaces, the upper end of the feedthrough pin extending through an aperture disposed in the cover, the lower end of the pin being disposed inside the housing and electrically connected to the anode, a ferrule disposed within the aperture and in electrical contact with the housing cover, an electrically insulative seal disposed between the ferrule and the pin and in sealing engagement therewith, a feedthrough pin insulator having first and second portions, the first portion being disposed at a location at or near the ferrule, the second portion being disposed at a location at or near the anode, the feedthrough pin insulator extending between the anode and the ferrule, at least portions of the feedthrough pin engaging or being enclosed within the feedthrough pin insulator, the feedthrough pin insulator electrically insulating the feedthrough pin from the ferrule and other cell components having the same electrical potential as the cathode, the feedthrough pin insulator having a gate attached to or forming part of the second portion, the gate having a sealing surface for preventing or inhibiting anode material from being extended or pushed therearound when the sealing surface is pushed against a sidewall of an anode formation cavity, the anode formation cavity having a preselected shape and configuration, during an anode compression step in the anode forming method, the method comprising the steps of:

(a) providing a lower punch and corresponding lower block, the lower block having the anode formation cavity and a support block cavity formed therein, the anode formation cavity having a sidewall;

(b) disposing the header assembly in the lower block such that that cover, the seal, the female, the upper end of the feedthrough pin and the first portion of the feedthrough pin insulator are disposed within the support block cavity and such that the sealing surface is disposed within the anode formation cavity and propinquant to the sidewall.

(c) placing an anode pre-form in the anode formation cavity (d) placing an upper punch guide having an upper punch cavity atop the lower block;

(e) placing an upper punch in the upper punch cavity;

(f) pressing the upper punch against the anode pre-cut to cause the pre-cut to be compressed and extruded such that the anode pre-cut assumes substantially the shape and configuration of the anode formation cavity and such that the sealing surface is forced against the sidewall by the compressed and extruded anode pre-cut.

* * * * *

UNITED STATES PATENT AND TRADEMARK OFFICE
CERTIFICATE OF CORRECTION

PATENT NO. : 5,811,206
DATED : Sep. 22, 1998
INVENTOR(S) : Walter C. Sunderland et al.

It is certified that error appears in the above-identified patent and that said Letters Patent is hereby corrected as shown below:

C. 13 L, 24  "titanium-6Al-4V" to be changed to "titanium-6A1-4V"
C. 13 L. 33  "titanium-6Al-4V" to be changed to "titanium-6A1-4V"

Signed and Sealed this

Ninth Day of November, 1999

Q. TODD DICKINSON

Attest:

Attesting Officer

Acting Commissioner of Patents and Trademarks